United States Patent [19]

Silvey

[11] 3,877,324

[45] Apr. 15, 1975

[54] GRINDER FOR SAW BAR MOUNTED SAW CHAIN

[76] Inventor: Elmer Ray Silvey, 1231 Dutton Rd., Eagle Point, Oreg. 97524

[22] Filed: Apr. 29, 1974

[21] Appl. No.: 465,175

[52] U.S. Cl. ................................ 76/25 A; 76/37; 76/40
[51] Int. Cl. ........................................... B23d 63/16
[58] Field of Search .......... 76/25 A, 40, 31, 35, 36, 76/37

[56] References Cited
UNITED STATES PATENTS

| | | | |
|---|---|---|---|
| 2,805,587 | 9/1957 | Goehle | 76/25 A |
| 3,020,783 | 2/1962 | Hill | 76/25 A |
| 3,089,351 | 5/1963 | Nyberg | 76/25 A |

Primary Examiner—Leonidas Vlachos
Attorney, Agent, or Firm—Klarquist, Sparkman, Campbell, Leigh, Hall & Whinston

[57] ABSTRACT

A machine for grinding saw chain on a chain saw bar includes a stand mounting a saw bar clamp and a new support table offset laterally from the clamp at the end of a swing arm carried by the stand. The saw support and clamp pivot about coincident vertical axis which pass through the lowermost grinding edge of a grinding wheel having an inclined axis of rotation in a vertical plane passing through such pivot axes so that the saw and bar can be swung together from one grinding position to another for sharpening both left-hand and right-hand cutter links without changing the wheel or saw adjustment. An adjustable chain hold-down pawl on the bar clamp positions each cutter link on the bar for grinding and stabilizes the saw chain on the bar while permitting forward movement of the chain along the bar to advance successive cutter links into grinding position. The grinding wheel pivots between a retracted position permitting forward movement of the chain on the bar and a grinding position in which its lowermost edge grinds a properly positioned cutter element on the saw bar. The axis of the grinding wheel is adjustable in a straight line in its vertical plane parallel to the wheel faces to compensate for wheel wear without requiring other adjustments of the machine or chain saw.

15 Claims, 5 Drawing Figures

GRINDER FOR SAW BAR MOUNTED SAW CHAIN

BACKGROUND OF THE INVENTION

1. Field of the Invention

The present invention relates to a grinding machine for grinding saw chain while such chain remains on a chain saw bar.

2. Description of the Prior Art

The present invention is an improvement of the saw chain grinder of applicant's prior U.S. Pat. No. 3,779,103. Such prior patent discloses a saw chain grinder capable of grinding both right-hand and left-hand cutters of all types of round-filed chain commonly known as chipper, microbit, microchisel, and L-chisel chain in identical respects in a fast, highly accurate manner without changing the adjustment or position of the grinding wheel and with a single simple change in position of the saw chain holder. While such prior grinder offers significant advantages and improvements over other known grinders in grinding speed, accuracy and simplicity, it is not capable of grinding saw chain while such chain remains on the chain saw bar. The chain must be removed from the bar and mounted in a special holder on the grinder, clamped in the holder, and adjusted with respect to the grinding wheel before the grinding operation can proceed. Then after grinding, the chain must be removed from the special holder and remounted and readjusted to the saw bar, all adding up to very time-consuming operations. For the chain saw operator, chain sharpener and logging company alike, this lost time represents lost production and therefore lost income.

Accordingly there is a need for a saw chain grinding machine having the advantages of the grinder of U.S. Pat. No. 3,779,103 and the added capability of sharpening saw chain accurately while the chain remains on the chain saw bar.

SUMMARY OF THE INVENTION

The present invention provides a saw chain grinder capable of grinding saw chain quickly, accurately and simply while it remains mounted on the chain saw bar.

An important feature of the invention is its ability to grind both right and left-hand cutters of saw bar-mounted chain with precision.

Another important feature of the invention is its ability to grind the cutter elements of both right-hand and left-hand cutter links of saw bar-mounted saw chain without readjusting the grinding wheel or repositioning the chain saw on the grinder.

A key feature is the provision of a saw support and a saw bar clamp with coincident vertical pivot axes which pass through the lowermost, grinding edge of the wheel and lie in the vertical plane of the wheel axis to enable the support and clamp, and thus the entire chain saw assembly, to swing together from one grinding position for sharpening right-hand cutters to a second grinding position for sharpening left-hand cutters without any other adjustment being required of grinder or saw.

Still another feature of the invention is an adjustable saw bar clamp capable of accomodating saw bars of different thicknesses without affecting the accuracy of the grinding operation.

A further feature is an adjustable drag for a turntable portion of the saw bar clamping mechanism whereby the clamp and a supported chain saw can be pivoted from a position for grinding the cutters of one hand to a second position for grinding the cutters of the opposite hand without loosening or tightening any adjustment bolts.

Another feature of the invention is the provision of a simple and adjustable saw chain hold-down device on the saw bar clamp for stabilizing each cutter link on the bar and holding it accurately in position for grinding while permitting forward movement of the saw chain on the saw bar to advance each successive cutter link into grinding position.

Another feature of the invention is its ability to grind saw bar-mounted chain with a grinding wheel having a simple straight line adjustment to compensate for wheel wear without requiring additional adjustment of the wheel, chain or other grinder elements.

The foregoing features are embodied in a grinding machine having a grinding wheel supported for rotation about an inclined axis and with its lowermost edge portion in position for grinding engagement with a cutter element of a saw chain carried by a saw bar clamped within a saw bar clamp device below the wheel. Both the saw bar clamp and a saw support offset laterally from the clamp have vertical pivot axes which pass through the lowermost grinding edge portion of the wheel and lie in the vertical plane of the wheel axis. This enables the clamp and saw support to be swung together from a first position for grinding cutters of one hand to a second position for grinding cutters of the opposite hand without changing the adjustment of the grinding wheel, the chain saw or any other grinder elements. A support for the wheel and its motor is slidably mounted to enable movement of the wheel axis in a straight line in the vertical plane of such axis and parallel to the faces of the wheel to compensate for wheel wear without requiring other adjustments. The wheel support is also mounted for pivoting movement between a retracted position providing clearance between the saw chain and the wheel and a grinding position wherein the lowermost edge portion of the wheel is in grinding position with respect to a cutter element of a saw chain on a saw bar held by the clamp device. The pivot axis of the wheel support includes a pivot locking means to lock the wheel in its grinding position and thereby free the operator's hands for other adjustments before beginning the grinding operation. A saw chain positioning and hold-down device on the clamp features three interchangeable pawls, one for use with saw chain having cutter links with cutter elements of intermediate or long lengths and the other two for use with right and left-hand cutter elements of short length where there is a tendency for the wheel to cut into the pawls. The hold-down device is provided with a quick-change mount for the pawls. The bar clamping means includes a transversely adjustable inner abutment face against which one side of the saw bar is clamped for proper positioning with respect to the wheel. The face can be adjusted so that the vertical median planes of saw bars of different thicknesses within the clamp will pass through the lowermost portion of the grinding wheel to provide for accurate chain sharpening regardless of saw bar thickness.

The foregoing and other objects, features and advantages of the present invention will become more apparent from the following detailed description which proceeds with reference to the accompanying drawing.

DETAILED DESCRIPTION

Figure 1:
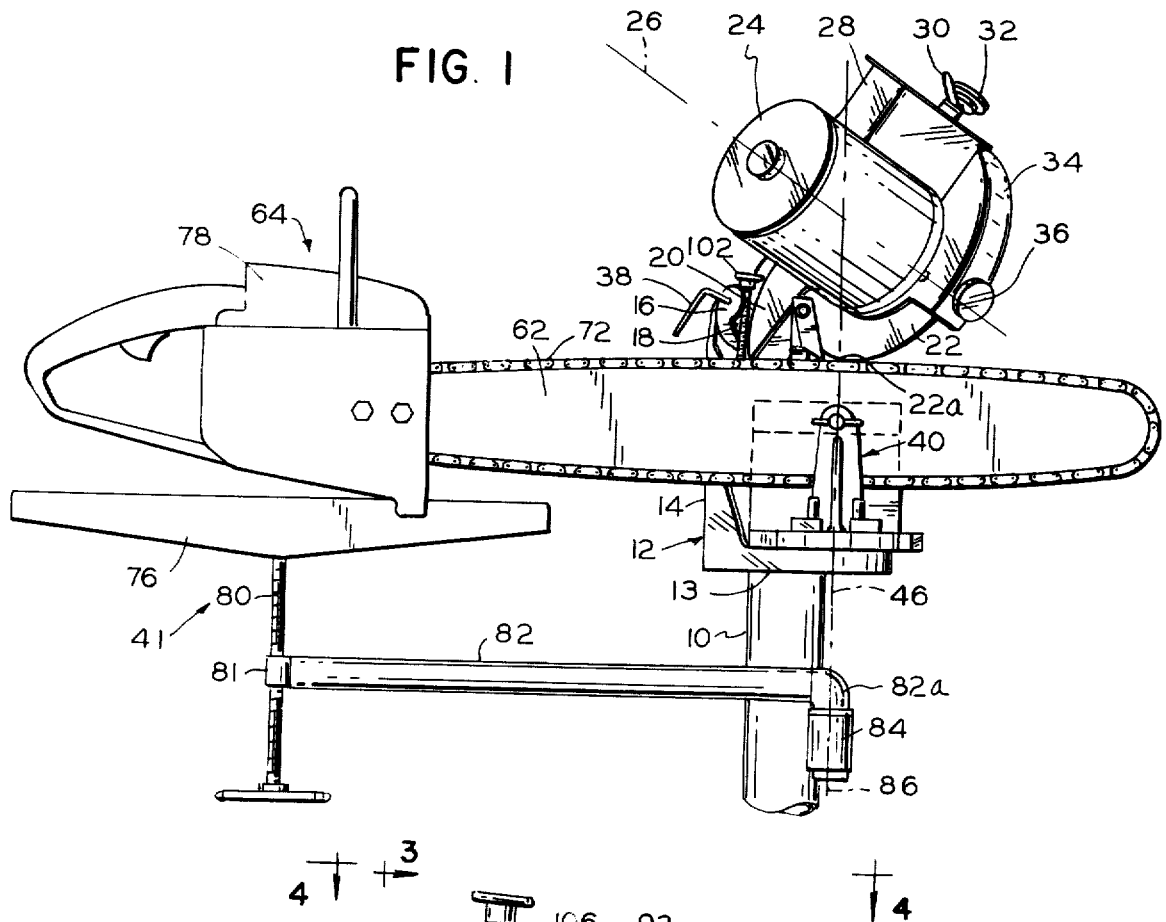
FIG. 1 is an elevational view of a saw chain grinder in accordance with the invention supporting a chain saw in grinding position.

With reference to the drawings, a preferred embodiment of a saw chain grinder of the present invention is shown in FIG. 1 and includes a support post 10 supporting at its upper end a generally L-shaped support frame 12 including a horizontal frame portion 13 and an upstanding frame portion 14. Upstanding frame portion 14 includes a mounting bracket means 16 at its upper end pivotally mounting a slide member 18 forming part of a support means 20. The support means supports a disc-shaped grinding wheel 22 and a reversible electric drive motor 24 for rotating the wheel about its central inclined axis 26. A control box 28 mounted atop the housing of motor 24 includes a three-way toggle switch 30 for controlling the operation and direction of operation of the motor and thus the direction of rotation of the grinding wheel.

Pivot mounting bracket 16 mounts wheel support structure and thus wheel 22 for pivoting movement about an inclined axis parallel to wheel axis 26 between a grinding position as shown in FIG. 1 and a retracted position in which the wheel clears a saw chain 72 on a saw bar 62 of a chain saw 64 supported on the machine. Slide member 18 of the support structure mounts the remaining wheel support structure 20 and thus the wheel itself for adjustment of wheel axis 26 in a straight line parallel to the faces of the wheel in the vertical plane of such axis to compensate for progressive wear of the grinding edge of the wheel. Such sliding adjustment of the wheel is made by turning the knob 32 of a slide adjustment screw (not shown) threaded through a portion of the support structure 20 slidable along slide member 18.

A front wheel guard portion 34 of the wheel support structure includes a knob 36 for facilitating the pivoting movement of the wheel between its retracted and grinding positions. A coil tension spring (not shown) fixed at its opposite ends to an upper portion of the upstanding frame portion 14 and an upper rear portion of the wheel support biases the wheel to its retracted position but enables the operator by gripping knob 36 to easily pivot the wheel to its grinding position. The pivot-mounting bracket 16 mounts the wheel so that in its grinding position the lowermost edge portion 22a of the wheel is the area of grinding engagement of the wheel with the cutter elements of a saw chain to be sharpened.

The pivot-mounting bracket includes a pair of socket head set screws (not shown) which extend into sockets at opposite sides of slide member 18. By screwing down one of such set screws using a wrenching tool 38 shown in FIG. 1, the grinding wheel can be temporarily locked in its grinding position against the tension of the retraction spring. This pivot locking feature enables the operator to leave the wheel temporarily in grinding position while freeing his hands to make other initial adjustments of the machine before commencing the sharpening operation.

The foregoing described wheel support, mounting and adjustment features are features which have proved to be advantageous in the grinder of U.S. Pat. No. 3,779,103 and are shown and described more fully in such patent. Such features have therefore been incorporated in the grinder of the present invention, and the description of such features in such prior patent is incorporated herein by reference.

Turning now to the structure for supporting the chain saw and the saw bar in proper position with respect to the grinding wheel for grinding the cutters of saw chain 72 on the saw bar, such structure includes a saw bar clamping means indicated generally at 40, and a chain saw support means indicated generally at 41. Clamping structure 40 includes a pair of upstanding clamping portions 42, 43 extending upwardly from a turntable portion 44. Turntable 44 is mounted for pivoting movement about a vertical pivot axis 46 on the horizontal frame portion 13 by a bolt 48 extending through an opening in such frame portion and threaded into a lower end of clamp turntable 44. A spring washer 50 between the head of bolt 48 and a second flat washer 52 places the bolt in tension. This pulls the lower bearing surface 44a of turntable 44 into sliding frictional engagement with the upper bearing surface 13a of horizontal base portion 13 to create a frictional drag which inhibits but does not prevent pivoting of the turntable. The drag is adjusted by adjusting the tension on bolt 48 so that the clamp is retained in a desired position of adjustment but can be pivoted with a slight effort to another position without loosening the bolt.

The two positions of adjustment of turntable 44 for sharpening right and left-hand cutters are determined by a pair of ears 54, 55 which project from opposite sides of turntable 44 and cooperate with a pair of adjustable screw stops 56, 57 threaded through stop blocks 58 on frame portion 13.

Figure 3:
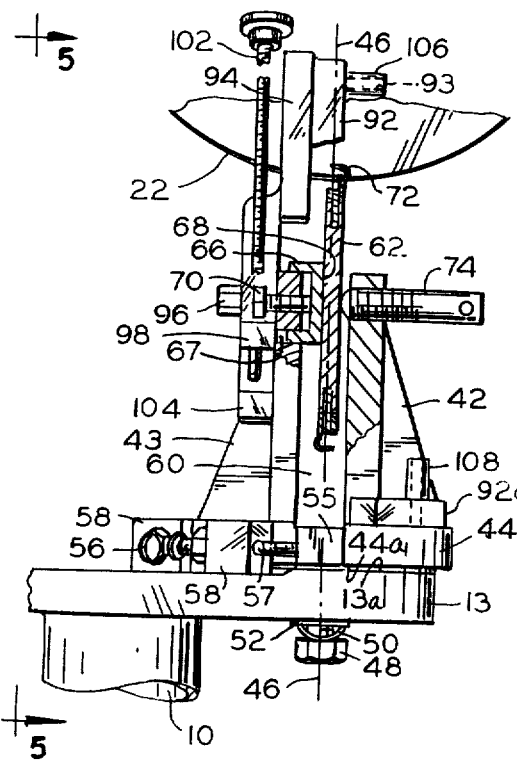
FIG. 3 is a vertical sectional view taken approximately along the line 3—3 of FIG. 2.

The pair of upstanding clamping portions 42, 43 are spaced apart laterally to define a slot 60 therebetween for receiving the saw bar 62 of chain saw 64. Clamping portion 43 has a transversely adjustable U-shaped slide member 66, the legs of which slide within transverse slots 67 in an upper end of such clamp portion as shown in FIG. 3. The connecting web portion of the slide member defines an inner vertical abutment face 68 against which one side of saw bar 62 abuts. The horizontal position of abutment face 68 is adjustable by a screw 70 threaded through an opening in clamp portion 43 against the outer face of slide member 66. The purpose of this adjustment feature is to enable saw bars of different thicknesses to be clamped within slot 60 against abutment face 68 with their vertical median planes in proper position with respect to the grinding wheel 22. For optimum grinding precision, the vertical median plane of a saw bar, represented by the line 46 in FIG. 3 and line 112 in FIG. 4, should pass through the lowermost edge portion of the grinding wheel, which in the illustrated embodiment is the area of grinding engagement of the wheel with the cutter elements of saw chain 72 on saw bar 62.

The saw bar is held against abutment face 68 by a clamping screw 74 threaded through an upper end portion of clamping member 42 and into clamping engagement against the opposite side of saw bar 62.

Referring again to chain saw support 41 of FIG. 1, such support includes a support table 76 which supports the heavy motor end 78 of chain saw 64 while saw bar 62 is clamped in saw bar clamping structure 40. Support table 76 is fixed to the upper end of a vertical adjustment screw 80 threaded through an outer nut portion 81 of a horizontal support arm 82 for vertical adjustment of the table relative to clamp 40. Support arm 82 extends laterally from main support post 10 where it has a downturned inner end 82a journaled within a bearing member 84 fixed to a side of the support post. Bearing 84 mounts arm 82 and thus the table and its supported saw for swinging movement about a vertical axis 86. It is important that the vertical swing axis 86 of the saw support is coincident with the vertical pivot axis 46 of saw bar clamping structure 40. This feature enables simultaneous swinging movement of the table and clamping structure and thus repositioning of the chain saw supported on the table with its saw bar clamped in the clamping structure without moving the saw on the table or the bar in the clamp. Because both pivot axes are coincident and pass through the lowermost, grinding edge of wheel 22, swinging of the saw from its first grinding position determined by turntable stop 57 to its second grinding position determined by turntable stop 56 is the only adjustment of the machine or saw necessary to grind the left-hand cutters of the saw chain after first grinding the right-hand cutters. Degree markings (not shown) may also be provided on the turntable or frame to enable accurate positioning of the table and clamp at any point between the two stops.

Figure 5:
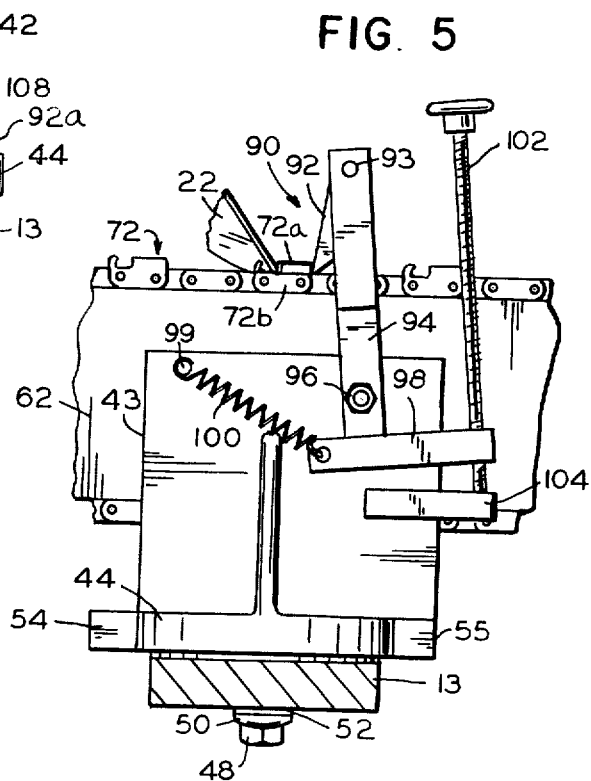
FIG. 5 is a view partly in section taken approximately along the line 5—5 of FIG. 3.

A saw chain hold-down stop means, indicated generally at 90 in FIG. 5, is provided in conjunction with clamping structure 40 for positioning and stabilizing the cutter element 72a of a cutter link 72b of saw chain 72 for grinding. As shown best in FIGS. 2, 3 and 5, such hold-down means includes an interchangeable pawl 92 which is suspended from a pivot pin projection 93 at the upper end of a pawl support lever 94. The support lever is in turn pivoted at 96 near its lower end to the upright clamping member 43. A cross lever member 98 is fixed to the lower end of support lever 94. A short arm portion of lever 98 is connected to an upper corner of upright clamping member 43 at 99 by a tension spring 100. The spring urges support lever 94 in a clockwise direction in FIG. 5 and thus pawl 92 in a direction upwardly and rearwardly of cutter link 72b. The support lever 94 is caused to resist the urging of spring 100 by a threaded adjustment screw 102 threaded through an outer end of a long arm of cross lever member 98 and into abutment against a stop bar 104 fixed to clamp member 43. By turning adjustment screw 102 downwardly against stop bar 104, support lever 94 is moved in a counterclockwise direction in FIG. 5, thereby moving pawl 92 downwardly against chain 72 and forwardly in a direction toward the lowermost edge of grinding wheel 22. Turning of adjustment screw 102 in the opposite direction causes tension spring 100 to move support lever 94 in the opposite direction and thus the pawl 92 upwardly and rearwardly of the saw chain.

In practice, pawl 92 and saw bar 62 are adjusted with respect to each other so that the lower pointed end of the pawl is on the drive link directly behind the cutter link 72b to be sharpened, with the rear of such cutter link abutting the pawl. The pawl is adjusted so that when cutter link 72b is pulled rearwardly, to the right in FIG. 5, against the pawl, cutter element 72a is in proper position to be ground. In such position the lowermost edge portion 22a of grinding wheel 22 extends into the gullet between the depth gauge and the cutting edge of the cutter element of link 72b and against such cutting edge, when the wheel is pivoted to its grinding position. However, as previously mentioned, wheel 22 pivots to a retracted position away from chain 72. This enables pushing of saw chain 72 forwardly along the top edge of the saw bar beneath pawl 92 to position successive cutters for grinding. However, pawl 92 prevents pulling of a cutter link rearwardly beneath the pawl. Thus the pawl serves both to position a cutter link accurately for grinding and to hold the chain down against the saw bar to stabilize it during the grinding operation. As will be apparent from FIG. 5, the lowermost edge portion of grinding wheel 22 also urges the cutter link being sharpened downwardly against the saw bar and rearwardly against the pawl to aid the hold-down pawl in its functions.

Figure 2:
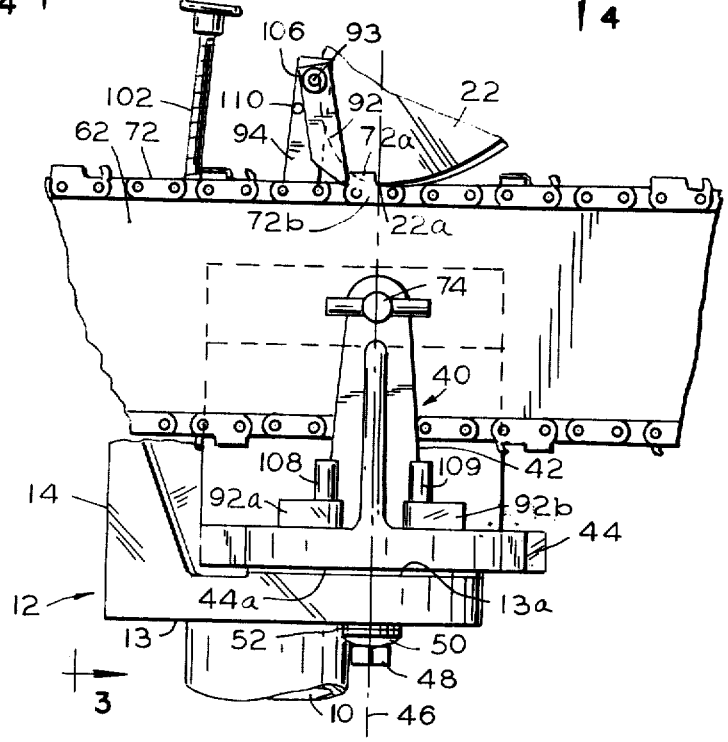
FIG. 2 is an enlarged elevational view of the saw bar clamping portion of the grinder of FIG. 1 with a saw bar clamped in place.

Hold-down pawl 92 is retained on pivot pin 93 by a resilient sleeve retainer 106 which slips over the outer end of the pivot pin, as shown most clearly in FIGS. 2 and 3. Pawl 92 can be quickly changed simply by slipping the resilient sleeve 106 from pin 93 and replacing the pawl. In practice, it has been found that it is useful to use three different pawls 92, one during the grinding of cutter links having cutter elements 72a of fairly long length such as found on a reasonably new chain, and two others, one each for sharpening the right and left-hand cutters with cutter elements that have been ground down to a short length. The advantage of this will be apparent from FIG. 2 where cutter link 72b with a short cutter element 72a has its cutting edge quite close to pawl 92. With any additional grinding of the cutter element, wheel 22 will also grind a notch in the pawl or may even grind off the tip of the pawl, making it unsatisfactory for use with longer cutter elements. To avoid this, a "good" pawl, that is, one that still has a full tip, is replaced by a second pawl 92a that may have part of its tip ground away, for sharpening the right-hand cutters of chain with short cutter elements. Pawl 92a is retained on a mounting pin 108 on turntable 44 when not in use. A third pawl 92b, stored on a second retaining pin 109 on turntable 44, is used during the sharpening of the left-hand cutter links of chain with short cutter elements. Pawl 92b may also have part of its tip ground away from sharpening left-hand cutters with short cutter elements.

The rearward pivoting movement of pawl 92 is normally prevented by the saw chain itself, when the saw bar and pawl are properly adjusted with respect to one another because of the forward angle of adjustment of the pawl. However, to ensure proper forward angular adjustment of the pawl, a pawl stop pin 110 is provided on an upper portion of pawl support lever 94. The stop pin prevents rearward pivoting movement of pawl 92 on pin 93 beyond its desired angle of adjustment and serves as a guide to proper adjustment of the height of the saw bar in the clamping structure.

From the foregoing description and the drawings, the proper relationship of the grinding wheel with respect to the cutter element to be sharpened and the pivot axes of the saw support table and saw bar clamp will be apparent. To ensure accurate and identical grinding of the right and left-hand cutter links of a given saw chain, it is the lowermost edge portion of the grinding wheel 22 which is in grinding engagement with the forward cutting edge of the cutter element to be sharpened when the wheel is in grinding position, that is, when the wheel is pivoted about its support mounting 16 from its retracted position to its grinding position. This in turn requires that the inner abutment face 68 of the saw bar clamp be adjusted to the thickness of saw bar 62 so that the median plane of the saw bar, represented by line 46 in FIG. 3 and line 112 in FIG. 4, passes through the lowermost edge portion of the wheel. To ensure that the saw bar and thus the saw chain will be so positioned when sharpening both the right-hand and the left-hand cutters of the chain, the coincident pivot axes 46 and 86 of the clamp and saw support, respectively, pass through the lowermost edge portion of the wheel when the wheel is in grinding position. Because the wheel is adjusted so that its area of grinding engagement with the cutters is its lowermost edge portion, the central axis of rotation of the wheel lies in a vertical plane that passes through the lowermost edge portion of the wheel and through the coincident pivot axes of the clamp and saw support structures.

The foregoing positional relationships are maintained in both clamp positions without requiring any adjustments of the grinder or of the chain saw on the grinder. This is evident from FIG. 4 where the lowermost edge portion 22a of the grinding wheel periphery, shown by line 22, the vertical plane of the wheel axis represented by line 112, the vertical median plane of the saw bar represented by line 114 in its first position of adjustment and by line 114a in its second position of adjustment, and the vertical pivot axes 46, 86 of the clamp and saw support structures, all intersect at a common point in FIG. 4. Thus, after a chain saw has been properly positioned and clamped on the grinding machine and the chain hold-down stop and grinding wheel set for grinding the cutters to the desired extent, no further adjustments are required to sharpen all of the cutters on the chain except for swinging the saw support table and thus the chain saw and clamp from one preset clamp position to the other in order to sharpen cutters of one hand after having sharpened the cutters of the opposite hand. Furthermore, the slide adjustment feature of the wheel provided by screw adjustment knob 32 adjusts a grinding wheel in a plane parallel to its faces and shifts wheel axis 26 in the vertical plane 112 of such axis to adjust for wear of the edge of the wheel without changing any other adjustment of the machine or saw and without affecting the accuracy of grinding.

OPERATION

In operation motor end 78 of the chain saw is placed on support table 76 with saw bar 62 extending through slot 60 of clamping structure 40. At this time grinding wheel 22 is in its spring-biased retracted position. Next the height of the saw bar is adjusted within the clamping slot until hold-down pawl 92 assumes about a 10° forward angle to the vertical, with the point of the pawl on the drive link just behind the cutter link to be sharpened. When this level is attained, clamp screw 74 is turned to clamp the bar firmly against the inner abutment face 68 of the clamping structure. The saw chain is then pulled firmly to the left as viewed in FIG. 2 until the rear end of cutter link 72b abuts the hold-down pawl. In this position, the pawl acts both to hold the cutter link against the saw bar and to position such link for sharpening. At this point, the screw 80 of saw support table 76 can be turned if necessary to adjust the level of the saw motor so that the saw bar extends approximately horizontally.

Next grinding wheel 22 is pivoted to its lowered, grinding position and locked temporarily in such position by turning the motor pivot lock wrench 38 lightly. This eliminates the necessity to manually hold the wheel in grinding position, thus freeing the operator's hands for other initial, fine adjustments. The grinding wheel is then adjusted for correct grinding height by turning slide adjustment knob 32 to move the lowermost edge portion of wheel 22 toward or away from the cutter element as required.

With the wheel still locked in grinding position, the position of the cutter link is adjusted for the desired amount of grinding. This is done by turning hold-down adjustment screw 102 to urge cutter element 72a of the first right-hand cutter link 72b toward the grinding wheel with the wheel rotating.

When the first right-hand cutter link has been ground to the desired extent, thus determining the amount of grinding of all cutters, the pivot lock for the wheel support is released to retract the wheel. The operator then pushes chain 72 forward on the bar (to the right in FIG. 1) until the next right-hand cutter link rides under hold-down pawl 92 and the pawl drops down behind it. Then he pulls the chain firmly to the rear (left in FIG. 1) against the pawl and pivots the wheel down to its grinding position to sharpen the cutter element. This sequence of retracting the wheel, pushing the chain forward until the next cutter rides under the pawl, pulling the chain back against the pawl and then pivoting the wheel down to grind the cutter link, is repeated until all right-hand cutter links have been sharpened.

Figure 4:
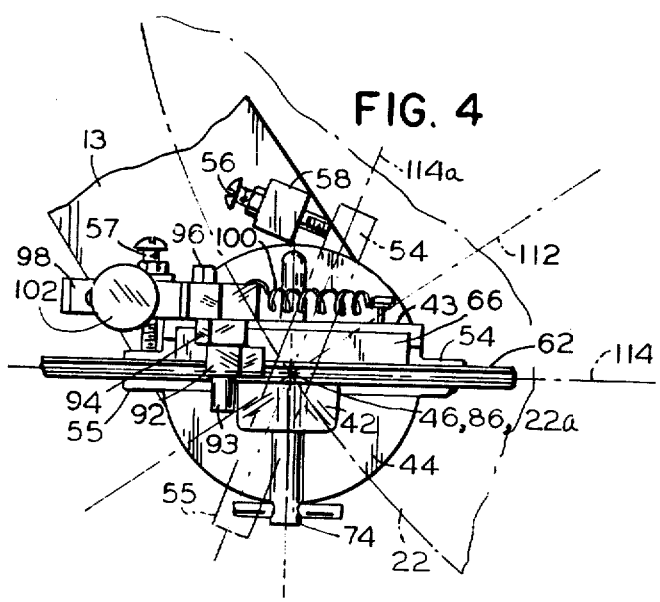
FIG. 4 is a horizontal sectional view taken approximately along the line 4—4 of FIG. 2.

The left-hand cutter links are now sharpened. To do this, wheel motor 24 is shut off and saw support table 76 is swung as shown in FIG. 4 until clamp turntable stop ear 54 abuts stop screw 56. When this occurs the saw bar, still clamped securely in the clamping structure 40, is in proper position for grinding the left-hand cutters of the chain 72 without any further adjustment of the wheel 22, hold-down pawl 92 or other grinder or saw elements. This swinging of the saw support and thus the entire saw and clamping structure occurs without loosening any bolts because of the adjustable drag feature of the clamp turntable 44.

With the saw bar thus positioned for sharpening the left-hand cutters, the motor switch is turned to its reverse position so that the grinding wheel is rotated into the left-hand cutters. Then the previously described sequence of grinding operations is repeated with respect to all of the left-hand cutters. When all of the left-hand cutters are sharpened, the saw bar is released from clamp 40 by turning clamp screw 74, and the chain saw is ready for use.

Although the present chain grinder is particularly intended for grinding the cutter links of saw chain while the chain remains on the saw bar with the saw bar remaining on the chain saw, the grinder can also be used to grind chain which has been removed from the saw bar. This is done by using a so-called "short bar" (not shown) simulating a short section of a saw bar, the upper edge of which has a guide rail like the guide rail about the periphery of a conventional normal saw bar. The length of chain is simply draped over such short bar and the short bar is mounted in the saw bar clamping structures in the same manner as described with respect to the normal saw bar. The adjustment of the short bar, hold-down pawl and grinding wheel would proceed as previously described, as would the sequence of grinding operations.

Having illustrated and described what is presently a preferred form of the invention, it should be apparent to those persons skilled in the art that the same permits of modification in arrangement and detail. I claim as my invention all such modifications as come within the true spirit and scope of the following claims.

I claim:

1. In a machine for sharpening the cutter elements of a saw chain while such chain remains on the bar of a chain saw, including a disc-shaped grinding wheel and wheel support means mounting said wheel for rotation about its central axis, saw bar clamping means for clamping a saw bar in a vertical disposition below said grinding wheel with a saw chain on said bar, said saw bar clamping means being pivotable about a vertical pivot axis passing through said area of grinding engagement of said grinding wheel to first and second positions of adjustment for grinding right and left-hand cutter elements respectively, adjustable saw chain hold-down means operable to permit forward movement of a saw chain on said saw bar and to hold a cutter link of the saw chain down against said saw bar and in an adjustable position relative to said area of grinding engagement of said wheel for receiving an edge of said wheel in grinding position with respect to a cutter element of said chain in either of said first and second positions of adjustment of said clamping means, and chain saw support means offset laterally from said clamping means for supporting the chain saw while said saw bar is clamped in said clamping means, said saw support means being swingable about a vertical swing axis coincident with said vertical pivot axis of said clamping means such that swinging movement of said saw support about said vertical swing axis causes a corresponding pivoting movement of said clamping means about its said pivot axis when a chain saw on said saw support means has its saw bar clamped in said clamping means.

2. The machine of claim 1 including means for moving said grinding wheel and said clamping means relative to one another to selectively move said wheel into and away from said grinding position, said axis of said wheel being in a vertical plane passing through the lowermost edge of said wheel and through said vertical axes of said clamping means and said saw support means when said wheel is in said grinding position.

3. The machine of claim 1 wherein said saw support means includes means for vertical adjustment of said support means relative to the level of said clamping means.

4. The machine of claim 1 wherein said clamp means includes means for adjusting the height of the top edge of said saw bar within clamp means.

5. The machine of claim 1 wherein said adjustable hold-down means includes means mounting said hold-down means on said clamping means for adjustment both vertically with respect to the top edge of a saw bar held by said clamping means and horizontally with respect to its distance from the lowermost edge of said grinding wheel.

6. The machine of claim 1 wherein said adjustable hold-down means includes hold-down pawl means and pawl support means, said pawl support means being adjustably mounted on said clamp means for adjusting the hold-down position of said pawl means, said pawl means including three interchangeable hold-down pawls, one for use with saw chain having cutter elements of normal lengths and the other two for use with the right and left-hand cutter links respectively of saw chain having cutter elements of abnormally short lengths, said pawl support means including quick change pawl-mounting means.

7. The machine of claim 6 wherein said quick change pawl-mounting means includes a mounting pin for pivotally mounting said pawls on said pawl support means and a resilient retainer sleeve sized to slip onto and off of said pin and to grip said pin when thereon to hold a selected said pawl in operating position.

8. The machine of claim 1 wherein said clamping means includes a pair of laterally opposed and spaced-apart upstanding clamp portions defining a slot therebetween for receiving a saw bar therebetween, one of said upstanding clamp portions including an inner planar vertical abutment face for abutment with one side surface of the saw bar, the other of said upstanding clamp portions including an adjustable clamping member movable toward and away from said abutment face to clamp the saw bar against said face.

9. The machine of claim 8 wherein said one upstanding clamp portion includes abutment face-adjustment means for horizontal adjustment of said abutment face toward and away from said other upstanding clamp portion to compensate for saw bars of different thicknesses whereby saw bars of different thicknesses can be clamped in said clamping means with their vertical median planes passing through said area of grinding engagement of said wheel.

10. The machine of claim 1 wherein said clamping means includes a turntable portion and mounting means pivotally mounting said turntable portion for pivoting movement about said vertical pivot axis relative to a machine base portion, said mounting means including friction-inducing drag means for inhibiting said pivoting movement and thereby tending to retain said clamping means in a preselected position of adjustment.

11. The machine of claim 6 wherein said clamping means includes means for storing two of said three pawls when not in use.

12. The machine of claim 1 wherein the lowermost edge portion of said grinding wheel defines said area of grinding engagement, said vertical pivot and swing axes passing through said lowermost edge portion when said wheel is in said grinding position.

13. The machine of claim 1 wherein said wheel support means mounts said wheel for movement between a retracted position permitting forward movement of said chain on said saw bar and a said grinding position in which the lowermost edge portion of said wheel defines said area of grinding engagement, said vertical swing and pivot axes passing through said lowermost edge portion and being in the vertical plane of the center axis of said wheel when said wheel is in said grinding position, said wheel support means including adjustment means for shifting said center axis in a straight line in said vertical plane to compensate for wear of the edge of said wheel.

14. The machine of claim 13 wherein said clamping means inclues a pair of laterally opposed and spaced-apart upstanding clamp portions defining a slot therebetween for receiving a saw bar, one of said upstanding clamp portions including an inner planar vertical abutment face for abutment with one side surface of the saw bar, the other of said upstanding clamp portions including an adjustable clamping member movable toward and away from said abutment face to clamp the saw bar against said face, said upstanding clamp portions being supported on a turntable base portion pivoted to a fixed base member of said machine for frictionally inhibited pivoting movement.

15. The machine of claim 14 wherein said one upstanding clamp portion includes abutment face adjustment means for horizontal adjustment of said abutment face toward and away from said other upstanding clamp portion to compensate for saw bars of different thicknesses whereby saw bars of different thicknesses can be clamped in said clamping means with their vertical median planes passing through the lowermost edge portion of said wheel.

* * * * *